United States Patent Office 3,669,534
Patented June 13, 1972

3,669,534
SLIDE PROJECTOR AND VIEWER
Erich Hofmann, Kriftel, Taunus, Ernst Krull, Kronberg, Taunus, Werner Hans Johannsen, Frankfurt am Main, Robert Oberheim, Neu Isenburg, and Josef Scheibel, Ober-Morlen, Germany, assignors to Braun Aktiengesellschaft, Frankfurt am Main, Germany
Filed June 27, 1969, Ser. No. 837,100
Int. Cl. G03b 21/00, 23/00
U.S. Cl. 353—21     18 Claims

ABSTRACT OF THE DISCLOSURE

A slide projector and viewer wherein the housing supports a pivotable insert provided with a gate for slides and carrying an optical element which acts as a magnifying lens in one angular position and as a component of a condensing lens in another angular position of the insert. The projection lamp directs light through the condensing lens in the one position of the insert whereby such light passes through the slide in the gate and through a projection lens so that the image of the slide is projected onto a screen. In the other position of the insert, the operator can look through the magnifying lens of the insert and a slide in the gate to see an enlarged image because the gate then extends across the path of a second light source, either a separate lamp or a reflector which directs some light issuing from the projection lamp against the underside of the slide.

BACKGROUND OF THE INVENTION

The present invention relates to slide projectors in general, and more particularly to improvements in apparatus which can be utilized as slide projectors or as slide viewers.

It is already known to provide apparatus for projection and viewing of slides with separate optical systems, namely, one for the projection of images and another for viewing. A drawback of such apparatus is that they are quite expensive because they must utilize two complete optical systems. It is also known to provide an apparatus for projection and viewing of slides with a single optical system which includes an objective of variable length. Such apparatus cannot insure optimum projection and optimum viewing; as a rule, the quality of projected and/or viewed images is well below a desirable optimum quality.

SUMMARY OF THE INVENTION

An object of our invention is to provide a slide projecting and viewing apparatus which need not embody two separate optical systems but is still capable of furnishing high-quality images during projection as well as during viewing.

Another object of the invention is to provide an apparatus which can be rapidly converted from a slide viewer into a slide projector, or vice versa.

A further object of the invention is to provide an apparatus wherein the parts which must be manipulated during conversion from projector to viewer or vice versa are of simple design and occupy little room in or on the housing of the apparatus.

An additional object of the invention is to provide an apparatus wherein at least certain operations which must be performed during conversion are carried out automatically in response to carrying out of the remaining operations.

Still another object of the invention is to provide an apparatus whose optical systems are less expensive and more versatile than the optical systems of presently known combined slide viewing and slide projecting apparatus.

A concomitant object of the invention is to provide the apparatus with a novel slide changer structure.

The improved slide viewing and projecting apparatus comprises support means which preferably consistitutes a hollow housing, first and second light sources mounted on the support means and respectively arranged to direct projection light and viewing light along separate paths, a gate for slides, an optical element in registry with the gate, and holder means (preferably constituting an insert which is pivotally mounted in the housing) supporting the gate and the optical element and movable with reference to the support means between a first position in which projection light directed by the first source passes through a slide in the gate and through the optical element and a second position in which viewing light directed by the second source reaches the eye through a slide in the gate and through the optical element.

The optical element preferably acts as a magnifying lens in the second position of the holder means; the user then looks through the magnifying lens and sees the image of the slide which is located in the gate because the slide is illuminated from behind with light directed by the second source. The optical element preferably acts as a converging lens in the first position of the holder means; this optical element then constitutes one component of a condensing lens whose other component is fixedly mounted in the support means between the first light source and the holder means. If the holder means is pivotable between its first and second positions, it preferably turns through an angle of more than 90 degrees during movement from first to second position or vice versa.

The novel features which are considered as characteristic of the invention are set forth in particular in the appended claims. The improved slide projector and viewer itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
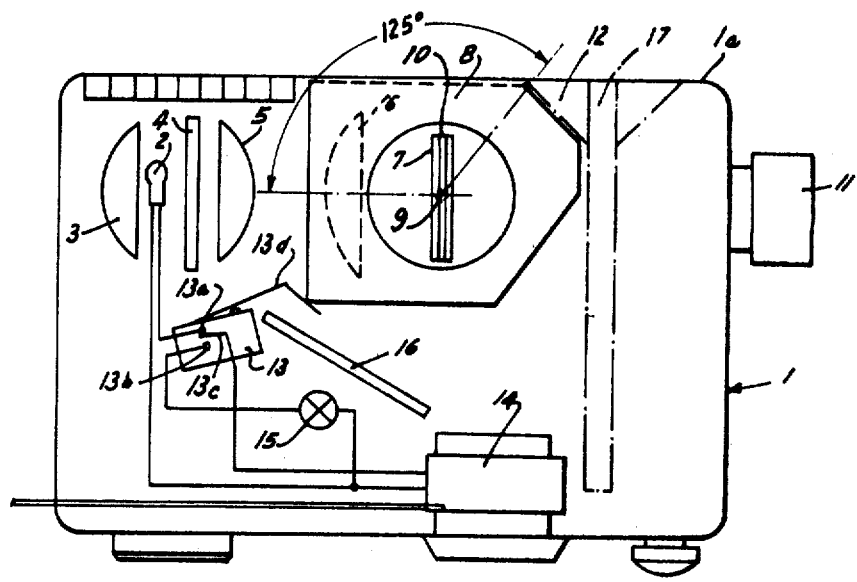
FIG. 1 is a schematic side elevational view of a projector and viewer with the holder means in first position and with a portion of the housing omitted.
Figure 2:
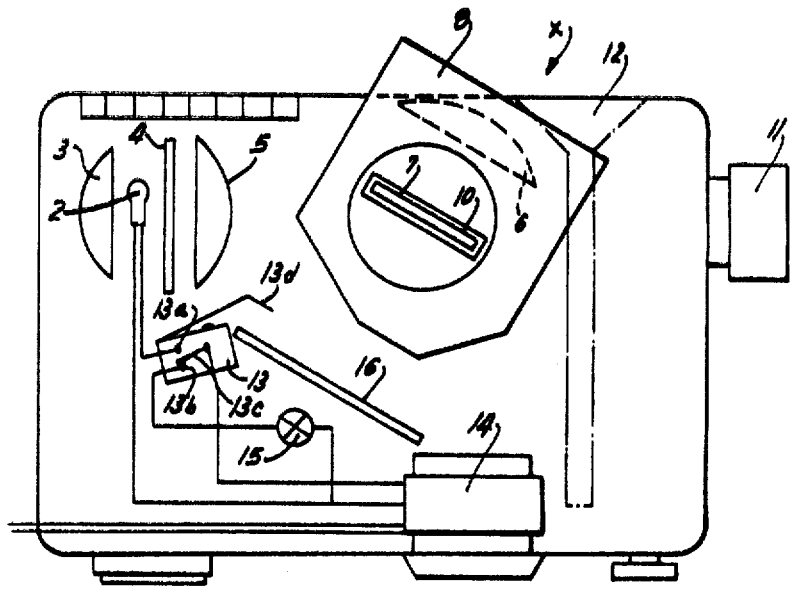
FIG. 2 is a similar view of the projector and viewer with the holder means in second position.

The slide projector and viewer of FIGS. 1 and 2 comprises a support in the form of a hollow housing 1 which accommodates a first light source or projection lamp 2 and a second light source or viewing lamp 15. The projection system further comprises a concave reflector 3 located behind the projection lamp 2, a heat filter 4 in front of the lamp 2, and a condensing lens including two discrete optical elements 5 and 6. The optical element 6 is installed in a holder means or insert 8 which further accommodates a slide-accommodating gate 7 and is pivotable about a horizontal shaft 9. The image of the slide 10 in the gate 7 is projected onto a screen by a projection lens 11 when the insert 8 assumes the first angular position shown in FIG. 1 in which the optical element 6 is located in front of the optical element 5. The element 6 then acts as a converging lens. The housing 1 includes a top wall 1a which is provided with an opening or window 12, and this window is filled or closed by the insert 8 when the latter assumes the angular position shown in FIG. 1. This insures that no light can escape from the housing 1 during projection of images of slides 10 onto a screen. The purpose of the window 12 is to permit pivotal movement of the insert 8 to the other or second angular position which is shown in FIG. 2 and in which the insert forms part of the viewer. In the position of FIG. 1, the insert 8 engages an arm 13d of an electric switch 13 which thereby completes the circuit of the projection lamp 2. In the position of FIG. 1, the switch 13 maintains its movable contact 13c in engagement with a fixed contact 13a whereby the lamp 2 is connected in circuit with an energy source here shown as including a transformer 14. The circuit of the viewing lamp 15 is completed when the insert 8 releases the arm 13d (see FIG. 2) so that the movable contact 13c can engage a second fixed contact 13b of the switch 13. The lamp 15 then illuminates a matte diffuser screen 16 of vitreous material. The housing 1 is further provided with a chamber or slot 17 which is located between the window 12 and projection lens 11 and is free to accept for storage a slide changer (not shown in FIGS. 1 and 2) which is employed to shift slides 10 into and from the gate 7. The slide changer can be inserted into the chamber 17 only when the insert 8 assumes the angular position shown in FIG. 1 in which it closes the window 12.

During movement from the position of FIG. 1 to the position shown in FIG. 2, the insert 8 must be turned through an angle of 125 degrees in a clockwise direction, as viewed in FIG. 1. The gate 7 is then located in front of the screen 16 and the user of the apparatus can view the slide 10 in the gate 7 by way of the optical element 6 which then constitutes a magnifying lens. As explained above, the contacts 13b, 13c automatically connect the viewing lamp 15 in circuit with the transformer 14 when the insert 8 moves to the position of FIG. 2 and is disengaged from the arm 13d of the switch 13. The lamp 15 is weaker than the projection lamp 2. It will be seen that the optical element 6 performs the dual function of serving as part of a condensing lens when it dwells in front of the optical element 5 and of serving as a magnifying lens for viewing of images of slides 10 on the screen 16 when the insert 8 maintains the element 6 in front of the screen 16.

The path of light which is directed by projection lamp 2 through the optical elements 5, 6, slide 10 in the gate 7 and projection lens 11 in the projection position of the insert 8 is preferably horizontal and the path of light which is directed by viewing lamp 15 upwardly through the screen 16, slide 10 in the gate 7 and optical element 6 in viewing position of the insert 8 intersects the horizontal path. The lamp 15 is located below the horizontal path, i.e., at a level below the optical axis of the projection lens 11. Since the insert 8 can turn through more than 90 degrees, an observer looking through the optical element 6 in viewing position of the insert 8 sees an upright image of the slide 10 in the gate 7.

Figure 3:
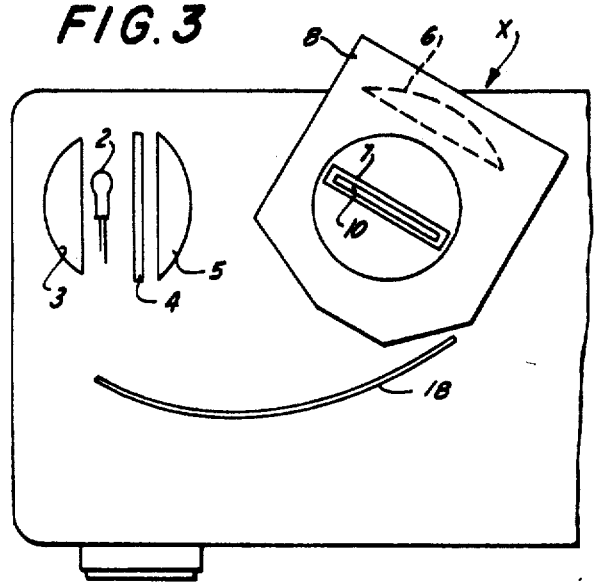
FIG. 3 is a fragmentary schematic side elevational view of a modified projector and viewer with the holder means in second position and with a portion of the housing omitted.

FIG. 3 illustrates certain details of a modified projector and viewer wherein the light source for viewing of slides comprises a paraboloidal reflector or mirror 18 capable of directing light against one side of the slide 10 in the gate 7 when the insert 8 assumes the second position shown in FIG. 3. Thus, the lamp 15 and screen 16 of FIGS. 1 and 2 can be dispensed with. The switch 13 is also omitted because the circuit of the projection lamp 2 remains completed when the apparatus is used as a slide projector as well as when it is used as a slide viewer. The extent of angular movement of the insert 8 between the position of FIG. 3 and the position corresponding to that shown in FIG. 1 is the same (125 degrees) as described above. When moved to the position corresponding to that shown in FIG. 1, the insert 8 maintains the optical element 6 in front of the optical element 5, heat filter 4, projection lamp 2 and reflector 3. The paraboloidal reflector 18 is designed in such a way that it directs a certain percentage of stray light issuing from the projection lamp 2 against the underside of the slide 10 in the gate 7 when the insert 8 assumes the position shown in FIG. 3. The optical element 6 enlarges the image which is detected by an observer looking in the direction indicated by arrow X.

Figure 4:
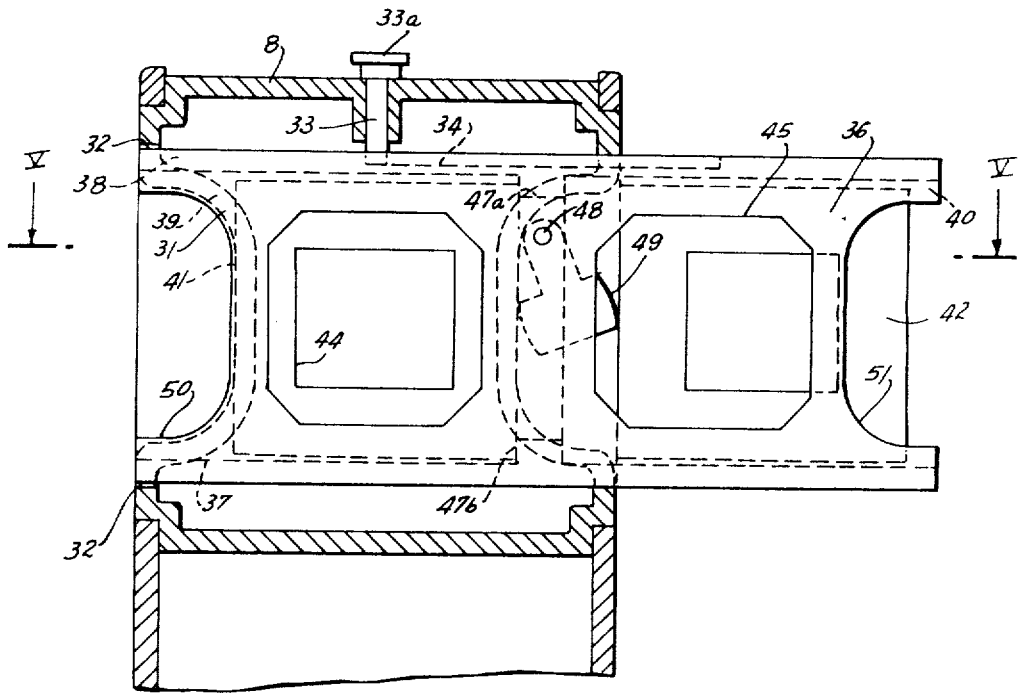
FIG. 4 is an enlarged fragmentary transverse vertical sectional view of the projector and viewer shown in FIG. 1.
Figure 5:
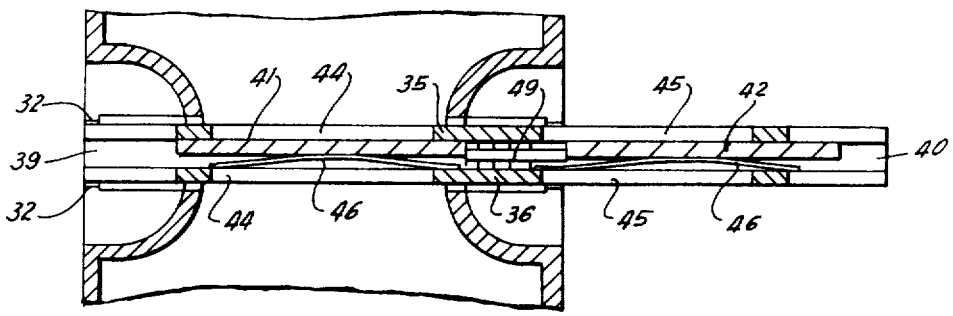
FIG. 5 is a sectional view as seen in the direction of arrows from the line V—V of FIG. 4.

A manually operated slide changer 31 which can be utilized with particular advantage in the appaartus of FIGS. 1-2 or FIG. 3 (and which can be stored in the chamber 17 of the housing 1) is shown in FIGS. 4 and 5. This slide changer 31 is movable lengthwise back and forth in guide means or ways 32 provided therefor in the insert 8. The extent of its reciprocatory movement with reference to the insert 8 is determined by a withdrawable pin 33 which normally extends into an elongated slot 34 provided in one edge face of the slide changer 31. A knob or handgrip portion 33a at the outer end of the pin 33 can be engaged by hand to withdraw the tip of the pin from the slot 34 so the slide changer 31 can be removed from the ways 32 and stored in the chamber 17 when the apparatus is not in use.

The slide changer 31 comprises two parallel panels 35, 36, a bottom portion 37 and a top portion 38. The panels 35, 36 define with the portions 37, 38 a narrow tunnel which is wide enough to accommodate slides 10. The tunnel comprises two open-ended sections or compartments 39, 40 each of which extends inwardly from one end of the slide changer 31. FIGS. 4 and 5 show a first slide 41 in the compartment 39 and a second slide 42 in the compartment 40. The panels 35, 36 are provided with pairs of registering apertures 44, 45 which are large enough to expose the image-carrying films of the slides 41, 42. These apertures 44, 45 permit light to pass through the slides from the projection lamp 2 by way of optical elements 5, 6 (FIG. 1), from the viewing lamp 15 (FIG. 2) or from the light-reflecting surface of the paraboloidal mirror 18 shown in FIG. 3.

To insure that the films of slides 41, 42 are maintained in predetermined planes, the tunnel of the slide changer 31 accommodates leaf springs 46 which bear against the frames of the slides 41, 42 and urge such frames against the adjoining portions of the panel 35. The springs 46 are preferably adjacent to the apertures 44, 45.

Those portions of the panels 35, 36 which separate the apertures 44 from the apertures 45 are provided with internal stops or abutments 47a, 47b which are engaged by the frames of slides 41, 42 when the films of these slides respectively register with the apertures 44, 45.

A slide displacing member or ejector 49 is installed between the panels 35, 36 in the region between the apertures 44, 45 so that it can turn about a pivot pin 48. The ejector 49 is T-shaped and its width (as seen in the longitudinal direction of slide changer 31) exceeds the distance between the apertures 44 and 45. Thus, when the slide 42 is being inserted into the compartment 40, its frame pivots the ejector 49 whereby the latter effects partial expulsion of slide 41 from the compartment 39. Inversely, when the slide 41 is moved to the position shown in FIG. 4, its frame causes the ejector 49 to effect partial expulsion of the slide 42 (or another slide) from the compartment 40. The partially ejected or partially inserted slide 42 can be readily grasped by hand because its frame extends into a cutout 51 at the respective end of the slide changer 31 when the frame of the slide 41 abuts against the stops 47a, 47b. A second cutout 50 in the left-hand end portion of the slide changer 31 permits removal of the slide 41 when the latter's frame is caused to move away from the stops 47a, 47b.

Once the film of the slide 42 is moved into accurate registry with the apertures 45, the operator pushes the slide viewer 31 in a direction to the left, as viewed in FIG. 4 or 5, until the tip of the pin 33 engages the surface at the right-hand end of the slot 34. This indicates to the operator that the slide 42 is located in the gate 7 of the insert 8 and that the image of the film can be projected onto a screen or observed in the direction indicated by arrow X (FIGS. 2 and 3).

The cutouts 50, 51 not only permit removal of partially ejected slides from the compartments 39, 40 but they also enable the operator to move the slide 41 or 42 into abutment with the stops 47a, 47b.

An important advantage of the improved slide changer 31 is that it can be moved back and forth horizontally and that it can accept and permit removal of slides at either end. In many conventional slide projectors, the slide changers are loaded from above; such slide changers would be less practical in our apparatus because, in the position of the insert 8 as shown in FIG. 1, the top portion 38 of the slide changer 31 is located above the optical axis of the projection lens 11 whereas, when the insert 8 is moved to the position of FIG. 2 or 3, the top portion 38 is located at a level below such optical axis. Thus, an inlet for slides in the top portion 38 would be accessible only in the projection position of the insert 8. Also, a slide would tend to leave its allocated space by gravity.

Another important advantage of the slide changer 31 is that its overall length is considerably less than the length of conventional manually operated slide changers. This is due to the fact that the slide (42 in FIG. 4) which is not in the gate 7 need not be located fully without the housing 1, i.e., such slide can extend into that portion of the slide changer 31 which is concealed in the housing 1 when the other slide (41 in FIG. 4) is fully accommodated in the gate 7.

It is further clear that the improved apparatus is susceptible of many additional modifications without departing from the spirit of our invention. For example, the switch 13 of FIGS. 1 and 2 can be replaced by two discrete switches one of which is closed by the insert 8 in the projection position of FIG. 1 to thereby complete the circuit of the projection lamp 2 and the other of which is closed by the insert 8 in the viewing position of FIG. 2 to thereby complete the circuit of the viewing lamp 15. Such arrangement also insures that only one of the two lamp circuits is completed at a time depending on the position of the insert 8.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. In an apparatus for projection and viewing of images of slides, a combination comprising support means; first and second light sources mounted on said support means and respectively arranged to direct projection light and viewing light along separate paths, a gate for slides, a first light refracting optical element in registry with said gate; holder means supporting said gate and said optical element and movable with reference to said support means between a first position in which projection light directed by said first source passes through a slide in said gate and said first optical element and a second position in which viewing light directed by said second source reaches the eye through a slide in said gate and said first optical element, said first optical element acting as a converging lens in the first position of said holder means; and a second light refracting optical element constituting with said first optical element a condensing optical system for light directed by said first source in the first position of said holder means, said first optical element acting as a magnifying lens in the second position of said holder means.

2. A combination as defined in claim 1, wherein said holder means is pivotable between said first and second positions.

3. A combination as defined in claim 2, wherein the angular displacement of said holder means during movement from one to the other position thereof exceeds 90 degrees.

4. A combination as defined in claim 1, wherein said support means comprises a housing and wherein said housing includes a wall provided with an opening, said holder means being arranged to closed said opening in one of said positions thereof.

5. A combination as defined in claim 4, wherein said wall is the top wall of said housing and wherein said holder means is pivotable in said housing between said first and second poistions thereof and closes said opening in the first position.

6. A combination as defined in claim 1, wherein each of said light sources comprises an electric lamp and further comprising a source of electrical energy and switch means having first and second positions in which it respectively connects said energy source with the lamp of said first and second source, said switch means being operative to connect said energy source with the lamp of said first light source in response to movement of said holder means to said first position and to connect said energy source with the lamp of said second light source in response to movement of said holder means to said second position.

7. A combination as defined in claim 6, wherein said holder means comprises a portion which is arranged to engage said switch means during movement of said holder means from one to the other position thereof.

8. A combination as defined in claim 1, wherein said second light source comprises reflector means and wherein said first source comprises lamp means arranged to direct some of its light output against said reflector means so that such light is reflected into said second path.

9. A combination as defined in claim 8, wherein said reflector means comprises a paraboloidal mirror.

10. A combination as defined in claim 1, further comprising slide changer means operative to move slides into and from said gate.

11. A combination as defined in claim 10, wherein said holder means comprises guide means for said slide changer means and wherein said slide changer means is provided with plural compartments each arranged to accommodate a slide, said slide changer means being movable with reference to said guide means between plural positions in each of which a slide accommodated in a different compartment is received in said gate.

12. A combination as defined in claim 11, wherein said slide changer means is reciprocable between said positions thereof and is provided with two open-ended compartments.

13. A combination as defined in claim 12, further comprising ejector means operative to expel at least a portion of a slide from one of said compartments in response to full insertion of a slide into the other compartment.

14. A combination as defined in claim 13, wherein said ejector means comprises an ejector pivotably mounted in said slide changer means between said compartments.

15. A combination as defined in claim 10, wherein said slide changer means is removably inserted into said holder means and wherein said support means comprises a housing provided with chamber means for storage of said slide changer means.

16. A combination as defined in claim 15, wherein said chamber means is accessible for reception of said slide changer means in one position of said holder means.

17. A combination as defined in claim 1, wherein said first and second sources comprise a common part.

18. A combination as defined in claim 1, wherein said first path is substantially horizontal and wherein said second path intersects said first path, said second source being located at a level below said first path.

References Cited

UNITED STATES PATENTS

| | | | |
|---|---|---|---|
| 2,445,929 | 7/1948 | Sturgess | 353—21 |
| 2,525,957 | 10/1956 | Schuler | 353—48 |
| 3,282,151 | 11/1966 | Bottani | 353—85 |
| 3,336,836 | 8/1967 | Gould | 353—21 |
| 3,348,449 | 10/1967 | Zillmer | 353—21 |
| 3,480,357 | 11/1969 | Tsuyama | 353—21 |
| 2,862,319 | 12/1968 | Lipfert | 353—111 |

FOREIGN PATENTS

| | | | |
|---|---|---|---|
| 1,258,305 | 4/1961 | France | 353—43 |

LEONARD FORMAN, Primary Examiner

A. J. MIRABITO, Assistant Examiner

U.S. Cl. X.R.

353—103